United States Patent
Kuwagaito

(10) Patent No.: US 9,551,866 B1
(45) Date of Patent: Jan. 24, 2017

(54) OPTICAL SCANNING SYSTEM AND SCANNING LENS

(71) Applicant: NALUX CO., LTD., Osaka-shi, Osaka (JP)

(72) Inventor: Tomohito Kuwagaito, Osaka (JP)

(73) Assignee: NALUX CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/139,815

(22) Filed: Apr. 27, 2016

(30) Foreign Application Priority Data

Dec. 24, 2015 (JP) .................................. 2015-251274

(51) Int. Cl.
*G02B 26/08* (2006.01)
*G02B 26/12* (2006.01)
*G02B 27/30* (2006.01)
*G02B 3/06* (2006.01)

(52) U.S. Cl.
CPC ........... *G02B 26/125* (2013.01); *G02B 26/123* (2013.01); *G02B 26/124* (2013.01); *G02B 3/06* (2013.01); *G02B 27/30* (2013.01)

(58) Field of Classification Search
CPC ............................. G02B 26/125; G02B 26/123
USPC ........... 359/204.1–207.6; 347/233, 243–244, 347/258–261
See application file for complete search history.

(56) References Cited

U.S. PATENT DOCUMENTS

| 6,046,835 A * | 4/2000 | Yamawaki | B41J 2/473 347/243 |
| 6,856,439 B2 | 2/2005 | Inagaki | |
| 6,987,593 B2 * | 1/2006 | Hayashi | B41J 2/471 347/244 |
| 2004/0109213 A1 * | 6/2004 | Takeuchi | G02B 26/125 359/216.1 |

FOREIGN PATENT DOCUMENTS

| JP | 2004-70190 A | 3/2004 |
| JP | 2004-361941 A | 12/2004 |

\* cited by examiner

*Primary Examiner* — James Phan
(74) *Attorney, Agent, or Firm* — Squire Patton Boggs (US) LLP

(57) ABSTRACT

In an optical scanning system, each of plural light beams is reflected at a point on a deflector in a sub-scanning cross section, a point of reflection on the deflector of the principal ray of each beam in the case that the principal ray is incident normally to a scanning surface in a main scanning cross section is designated as a fiducial point, distance from the fiducial point to the scanning surface is designated as L, distance from the center of curvature of the exit surface of one of the second scanning lenses for a light beam i to the scanning surface is designated as $BF_i$, refractive powers of the first scanning lens and one of the second scanning lenses are designated as $\phi 1 s_i$ and $\phi 2 s_i$, and then the following expressions are satisfied.

$$0.15 \leq BF_i/L \leq 0.2 \quad (1)$$

$$0.4 \leq \phi 1 s_i / \phi 2 s_i \leq 1 \quad (2)$$

6 Claims, 5 Drawing Sheets

OPTICAL SCANNING SYSTEM AND SCANNING LENS

BACKGROUND

Field

The present invention relates to an optical scanning system and scanning lenses which are used for printers and the like.

Description of the Related Art

For the purpose of downsizing of printer devices, a shorter distance between a lens in the optical scanning system and the photoconductive drum or the scanning surface, that is, a shorter back focus is required.

Conventionally, optical scanning systems with a shorter back focus for tandem type color printers have been proposed (JP2004-361941A and JP2004-070190A, for example).

However, in an arrangement in which a lens is simply located in the vicinity of the photo conductor, efficiency of the optical system becomes lower, and therefore an amount of light becomes insufficient. Until now, an optical scanning system that has a shorter back focus and a higher energy efficiency and scanning lenses for realizing such an optical scanning system have not been developed.

JP2004-361941A
JP2004-070190A

Accordingly, there is a need for an optical scanning system that has a shorter back focus and a higher energy efficiency. The object of the present invention is to provide an optical scanning system that has a shorter back focus and a higher energy efficiency and scanning lenses for realizing such an optical scanning system.

SUMMARY

An optical scanning system according to a first aspect of the present invention is an optical scanning system including a system for receiving light and a system for imaging, the system for receiving light being configured such that plural light beams reach a single deflector and the system for imaging being configured such that each of the plural light beams deflected by the deflector is collected on a corresponding scanning surface. The system for imaging includes a first scanning lens and plural second scanning lenses, the first scanning lens being arranged to make the plural light beams pass through and each of the second scanning lenses being arranged to make each of the plural light beams pass through. A direction which is parallel to the rotation axis of the deflector is designated as a sub-scanning direction, a cross section that has a normal extending in the sub-scanning direction is designated as a main scanning cross section, a direction which is obtained by projecting a direction in which each collected light beam moves on the corresponding scanning surface by scanning, onto the main scanning cross section is designated as a main scanning direction, and a cross section that has a normal extending in the main scanning direction is designated as a sub-scanning cross section. A point of reflection on the deflector of the principal ray of a light beam i among the plural light beams, i being an integer used to designate a light beam, in the case that the principal ray is incident normally to the corresponding scanning surface in a main scanning cross section is designated as a fiducial point, in a main scanning cross section, distance from the fiducial point to the corresponding scanning surface is designated as L, distance from the center of curvature of the exit surface of one of the second scanning lenses for the light beam i to the corresponding scanning surface is designated as BFi, refractive power of the first scanning lens for the light beam i is designated as $\phi 1si$, refractive power of the one of the second scanning lenses for the light beam i is designated as $\phi 2si$, and then the following expressions are satisfied.

$$0.15 \leq BFi/L \leq 0.2 \tag{1}$$

$$0.4 \leq \phi 1si/\phi 2si \leq 1 \tag{2}$$

In the optical scanning system according to the first aspect of the present invention, in spite of a small BFi, the lateral magnification m in the sub-scanning direction (sub-magnification) of the optical system for imaging can be increased by determining the range of $\phi 1si/\phi 2si$ as described by Expression (2). This leads to increasing the aperture width (length of a side of the aperture) in the sub-scanning direction required to obtain a desired beam width in the sub-scanning direction on the scanning surface. Accordingly, an optical scanning system with a higher energy efficiency can be obtained. The reason that the upper limit is provided in Expression (2) is that too great $\phi 1si$ makes it difficult to provide spaces between the plural light beams having passed through the first scanning lens, and therefore entry side angles in a sub-scanning cross section have to be increased to provide the spaces so that the size in the sub-scanning direction of the optical system for receiving light becomes greater, and downsizing of the optical system cannot be realized. The above-described entry side angles in the sub-scanning cross section are represented as θsi and θso in FIGS. 4B and 5B, and will be described later. The reason that the lower limit is provided in Expression (1) is that too small distance between a scanning lens and the corresponding scanning surface makes the diameter of the light beam that passes through the lens so small that a foreign material in the lens has a great influence, and therefore the yield is reduced.

In an optical scanning system according to a first embodiment of the first aspect of the present invention, the system for receiving light is configured such that each of the plural light beams is reflected at a point on the deflector in a sub-scanning cross section.

In an optical scanning system according to a second embodiment of the first aspect of the present invention, the system for receiving light includes plural collimator lenses, each of the plural collimator lenses collimating each of the plural light beams, and a cylindrical lens that collects the collimated plural light beams on a face of the deflector, and the focal length fcy of the cylindrical lens is 105 millimeters or more and 140 millimeters or less.

In the optical scanning system according to the present embodiment, the aperture width (length of a side of the aperture) in the sub-scanning direction of the aperture stop set in the optical system for receiving light can be increased by the use of a cylindrical lens with a great focal length, thus improving the energy efficiency. The reason that the upper limit of the focal length is provided is that too great focal length makes the size in the sub-scanning direction of the optical system for receiving light great, and downsizing of the optical system cannot be realized.

In an optical scanning system according to a third embodiment of the first aspect of the present invention, each of the plural second scanning lenses has a negative refractive power in the vicinity of the straight line connecting the center of curvature of the entry surface and the center of curvature of the exit surface and has a positive refractive power at each edge in a main scanning cross section.

In general, in optical scanning system with a shorter back focus, length of each of the second scanning lenses is very great, thus possibly increasing costs. When each of the second scanning lenses is shaped as recited in the present embodiment, a shape with a small ratio of the minimum thickness to the maximum thickness and a very small thickness can be realized, this leading to reduction in costs.

In an optical scanning system according to a fourth embodiment of the first aspect of the present invention, when for each of the entry surface and the exit surface of the first scanning lens, the center of curvature is designated as the origin point, the straight line connecting the center of curvature of the entry surface and the center of curvature of the exit surface is designated as z axis, and x axis and y axis orthogonal to each other are defined in a plane that contains a point of z=0 and is perpendicular to z axis, the first scanning lens is located such that y axis of the entry surface and y axis of the exit surface are in the main scanning direction, and x axis of the entry surface and x axis of the exit surface are in the sub-scanning direction, and the shape in a xz cross section of at least one of the entry surface and the exit surface of the first scanning lens is asymmetric with respect to y=0.

According to the present embodiment, by making the shape in a xz cross section (corresponding to a sub-scanning cross section) of at least one of the entry surface and the exit surface of the first scanning lens asymmetric with respect to y=0, a curvature of field and a bow in the sub-scanning direction that are formed asymmetric in the main scanning direction can be appropriately corrected.

Definitions of a main scanning direction, a sub-scanning direction, a main scanning cross section and a sub-scanning cross section will be given later.

Scanning lenses according to a second aspect of the present invention are a combination of the first scanning lens and the plural second scanning lenses that are used in any of the optical scanning systems according to the first aspect of the invention and its embodiments.

By the use of the combination of the first scanning lens and the plural second scanning lenses according to the present aspect, an optical scanning system that has a shorter back focus and a higher energy efficiency can be realized.

DETAILED DESCRIPTION

Figure 1:
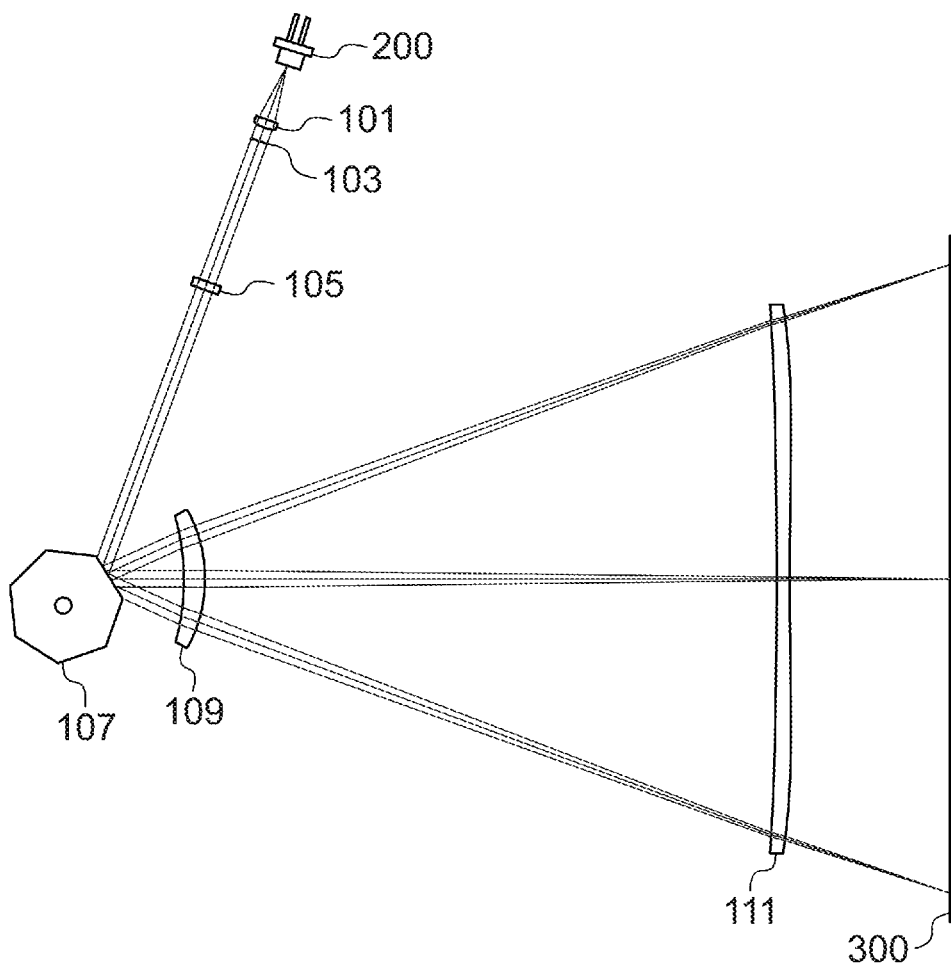
FIG. 1 shows a construction of a typical optical scanning system.

FIG. 1 shows a construction of a typical optical scanning system. The optical scanning system includes a collimator lens 101, an aperture stop 103, a cylindrical lens 105, a polygon mirror 107 which functions as a deflector, a first scanning lens 109 and a second scanning lens 111. Light beam emitted by a laser diode 200 which functions as a light source, is converted into a substantially parallel light beam by the collimator lens 101, made to pass through the aperture stop 103 and the cylindrical lens 105, reflected by the polygon mirror 107, and then collected on a scanning surface 300 by the first scanning lens 109 and the second scanning lens 111. The position at which the light beam is collected on the scanning surface 300 is changed by rotation of the polygon mirror 107, and thus scanning with the light beam is performed. The rotation axis of the polygon mirror 107 is in the direction which is perpendicular to the sheet of FIG. 1.

In the optical scanning system, a main scanning direction, a sub-scanning direction, a main scanning cross section, and a sub-scanning cross section are defined as below. A sub-scanning direction is the direction that is parallel to the rotation axis of the deflector, that is, the polygon mirror. A main scanning cross section is a cross section that has a normal extending in the sub-scanning direction. A main scanning direction is the direction of the movement of a point which is obtained by projecting the position at which the light beam is collected on the scanning surface onto the main scanning cross section. A sub-scanning cross section is a cross section that has a normal extending in the main scanning direction. FIG. 1 shows a main scanning cross section of the typical optical scanning system.

Figure 2:
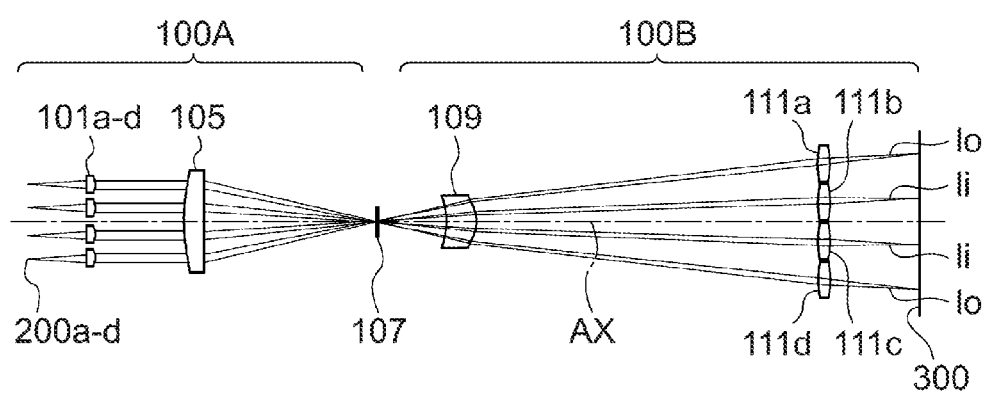
FIG. 2 illustrates an optical scanning system for a tandem type color printer.

FIG. 2 illustrates an optical scanning system for a tandem type color printer. FIG. 2 is a conceptual diagram showing a sub-scanning cross section of the optical scanning system. The optical scanning system includes four light sources 200a, 200b, 200c, and 200d, four collimator lenses 101a, 101b, 101c, and 101d, and four second scanning lenses 111a, 111b, 111c, and 111d. In FIG. 2, the aperture stop is omitted. The optical system from the light sources to the deflector 107 is referred to as an optical system for receiving light 100A, and the optical system from the deflector to the scanning surface 300 is referred to as an optical system for imaging 100B.

Four light beams emitted by the four light sources 200a, 200b, 200c, and 200d are converted into four substantially parallel light beams respectively by four collimator lenses 101a, 101b, 101c, and 101d, and then collected on a face of the polygon mirror 107 by a single cylindrical lens 105. Although in actuality, the four light beams are collected in a line on a face of the polygon mirror 107 as shown in FIG. 1, on a sub-scanning cross section they are collected at a point as shown in FIG. 2. The four light beams reflected on a face of the polygon mirror 107 pass through the single first scanning lens 109 and corresponding one of the four second scanning lenses 111a, 111b, 111c, and 111d and then are collected on the scanning surface 300.

In the sub-scanning cross section shown in FIG. 2, the straight line which passes through the reflecting point on a face of the polygon mirror 107 and which is perpendicular to the rotation axis of the polygon mirror 107 is referred to as a reference axis AX. In the sub-scanning cross section, the optical scanning system is symmetric with respect to the reference axis AX. Among the four light beams reflected by the polygon mirror 107, the two light beams each of which forms a smaller angle with the reference axis AX are referred to as inside light beams li and the two light beams each of which forms a greater angle with the reference axis AX are referred to as outside light beams lo.

Figure 3:
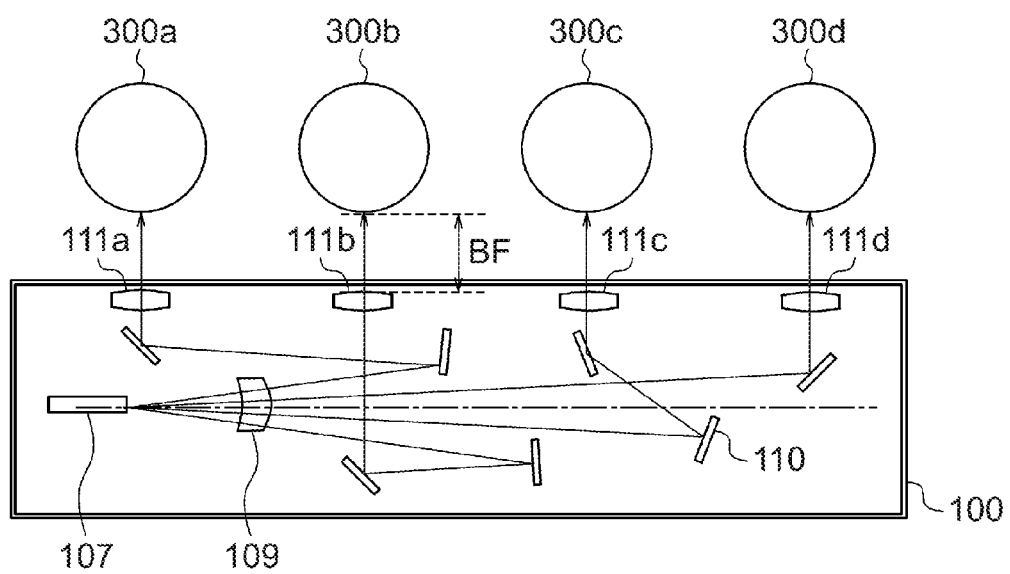
FIG. 3 shows a sub-scanning cross section of an optical scanning system for a tandem type color printer.

FIG. 3 shows a sub-scanning cross section of an optical scanning system for a tandem type color printer. Each of the four light beams reflected by the polygon mirror 107 passes through the first scanning lens 109, is reflected by a corresponding one of folding mirrors 110, passes through a corresponding one of the four second scanning lenses 111a, 111b, 111c, and 111d, and is collected on a surface of a corresponding one of four photoconductive drums 300a, 300b, 300c, and 300d. The unit 100 which accommodates the above-described optical scanning system is referred to as a laser scanning unit (LSU). In FIG. 3, one alone of the plural folding mirrors is marked with a reference numeral for the sake of simplicity of the drawing.

Examples of the present invention will be described below. The entry surface and the exit surface of the first scanning lens and those of the second scanning lenses of each example can be expressed by the following equation. The four second scanning lenses 111a, 111b, 111c, and 111d have the identical shape.

$$z = \frac{\frac{r^2}{R}}{1 + \sqrt{1 - (1+k)\frac{r^2}{R^2}}} + \sum_{i=1}^{M} \sum_{j=1}^{N} A_{ij} \cdot x^j y^i$$

where $$r = \sqrt{x^2 + y^2}$$

The origin point of the coordinate system of each surface is located at the center of curvature of the surface. The straight line connecting the center of curvature of the entry surface and the center of curvature of the exit surface is defined as z axis. The direction from the entry surface to the exit surface is defined as the positive direction. The direction along z axis corresponds to the direction of sag of a lens. For each surface, x axis and y axis which are orthogonal to each other are defined in the plane containing a point of z=0 and perpendicular to z axis.

The first scanning lens is positioned such that y axis is in the main scanning direction, x axis is in the sub-scanning direction, in a main scanning cross section the principal ray of the light beam that is perpendicular to the scanning surface passes through the points corresponding to the center of curvature of the entry surface and that of the exit surface, and in a sub-scanning cross section the reference axis passes through the points corresponding to the center of curvature of the entry surface and that of the exit surface. Each of the second scanning lenses is positioned such that y axis is in the main scanning direction, in a main scanning cross section, the principal ray of the light beam that is perpendicular to the scanning surface passes through the points corresponding to the center of curvature of the entry surface and that of the exit surface, and in a sub-scanning cross section, x axis and the sub-scanning direction forms a predetermined angle (acute angle), and each of the four light beams passes thorough each of the second scanning lenses. The angle (acute angle) described above is referred to as an amount of tilt.

"r" represents distance from the straight line connecting centers of curvature of the two optical surfaces of a lens. "k" represents conic constant, and "R" represents radius of curvature. "Aij" represents coefficients.

The material of the first scanning lens is poly cycloolefin resin, refractive index of which is 1.503. The material of the second scanning lenses is poly methyl methacrylate resin, refractive index of which is 1.485. The second scanning lenses are long in the main scanning direction, and therefore the use of a lower-cost material is preferable.

Example 1

Figure 4A:
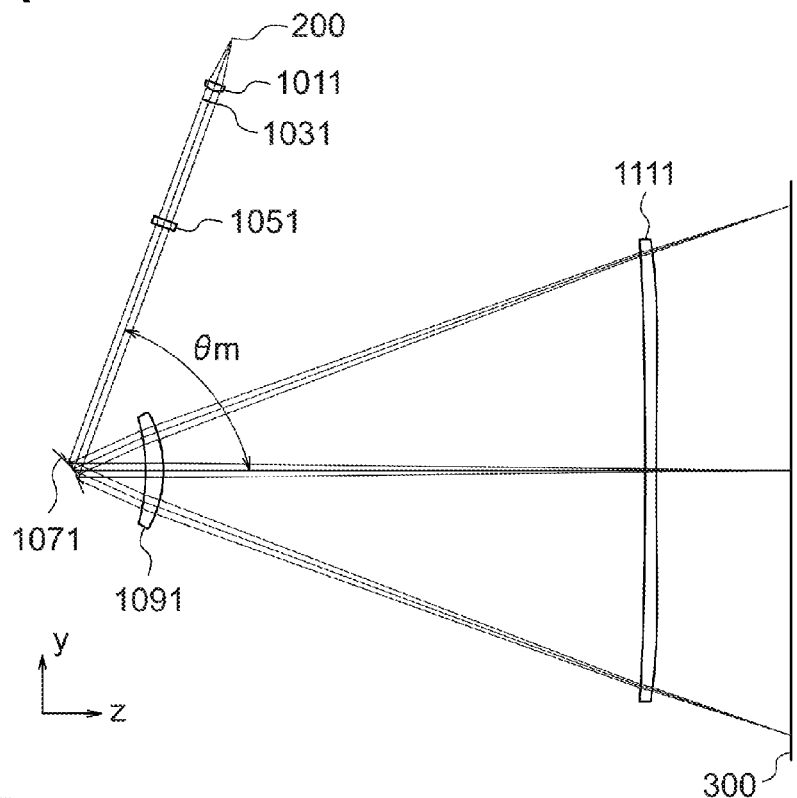
FIG. 4A shows a main scanning cross section of the optical scanning system of Example 1.
Figure 4B:
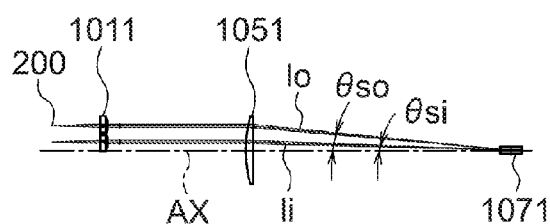
FIG. 4B shows a sub-scanning cross section of the optical system for receiving light of the optical scanning system of Example 1.
Figure 4C:
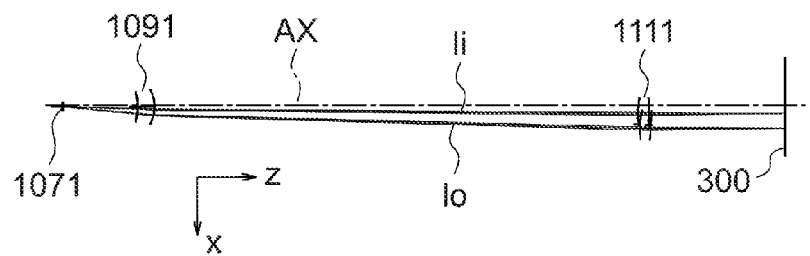
FIG. 4C shows a sub-scanning cross section of the optical system for imaging of the optical scanning system of Example 1.

FIGS. 4A, 4B and 4C show a construction of an optical scanning system of Example 1. FIG. 4A shows a main scanning cross section of the optical scanning system of Example 1. FIG. 4B shows a sub-scanning cross section of the optical system for receiving light of the optical scanning system of Example 1. FIG. 4C shows a sub-scanning cross section of the optical system for imaging of the optical scanning system of Example 1.

In the main scanning cross section shown in FIG. 4A, the angle that the path of the principal ray of the light beam that passes through the collimator lens 1011 and the center of the aperture stop 1013 and the path of the principal ray which is reflected by the polygon mirror 1071 and is perpendicular to the scanning surface 300 form is referred to as an entry-side angle θm in the main scanning cross section.

In FIG. 4A, y axis of the first scanning lens 1091 is in the main scanning direction (which is parallel to the scanning surface 300) and the positive direction is upward. Z axis of the first scanning lens 1091 is perpendicular to the scanning surface 300 and the positive direction is rightward.

In the sub-scanning cross sections shown in FIGS. 4B and 4C, two light beams alone among the four light beams actually existing are shown for the sake of simplicity of the drawings. Among the two light beams, the one that is positioned nearer to the reference axis is referred to as an inside light beam li and the other one is referred to as an outside light beam lo. In the sub-scanning cross section shown in FIG. 4B, the angle that the principal ray of the inside light beam li that is incident on the polygon mirror 1071 forms with the reference axis AX is referred to as an entry-side angle θsi of the inside light beam li in the sub-scanning cross section, and the angle that the principal ray of the outside light beam lo that is incident on the polygon mirror 1071 forms with the reference axis AX is referred to as an entry-side angle θso of the outside light beam lo in the sub-scanning cross section In FIG. 4C, x axis of the first scanning lens 1091 is in the sub-scanning direction (which is parallel to the scanning surface 300) and the positive direction is downward. Z axis of the first scanning lens 1091 is perpendicular to the scanning surface 300 and the positive direction is rightward.

Table 1A shows specifications of the optical scanning system of Example 1 and Table 1B shows the arrangement of the optical scanning system of Example 1.

TABLE 1A

| Item | | Unit | Example 1 |
|---|---|---|---|
| Effective scanning width | | mm | 220 |
| Entry-side angle | Main | deg | 70 |
| | Sub | deg | Inside light beam 1.8 |
| | | | Outside light beam 5.4 |
| Focal length of system | | mm | 254.925 |

TABLE 1A-continued

| Item | | Unit | Example 1 |
|---|---|---|---|
| Light source | Wavelength | mm | 785 |
| | θ⊥ | deg | 30 |
| | θ// | deg | 10 |
| Collimator lens | Focal length | mm | 20 |
| Cylindrical lens | Focal length | mm | 110 |
| Aperture (rectangle) | Main | mm | 5.8 |
| | Sub | mm | 1.36 |
| Polygon mirror | Number of faces | — | 7 |
| | Size | mm | Diameter of circumcircle φ = 36 |
| First scanning lens | Center thickness | mm | 7 |
| | Refractive index | — | 1.503 |
| Second scanning lens | Center thickness | mm | 4.5 |
| | Refractive index | — | 1.485 |

TABLE 1B

| | | Arrangement | |
|---|---|---|---|
| Item | Unit | Inside light beam | Outside light beam |
| Amounts of shift in sub-scanning direction (of light source, collimator lens and aperture stop) | mm | 3.451 | 10.24 |
| Distance between exit surface of collimator lens and fiducial point of deflection | mm | 168 | 168 |
| Distance between aperture stop and fiducial point of deflection | mm | 163 | 163 |
| Distance between exit surface of cylindrical lens and fiducial point of deflection | mm | 107.65 | 107.65 |
| Distance between fiducial point of deflection and entry surface of first scanning lens | mm | 30 | 30 |
| Distance between fiducial point of deflection and entry surface of second scanning lens | mm | 235 | 235.859 |
| BF: Distance between exit surface of second scanning lens and photo conductor (scanning surface) | mm | 55.5 | 54.866 |
| L: Distance between fiducial point of deflection and scanning surface | mm | 295 | 295.225 |
| Amount of shift in sub-scanning direction of second scanning lens | mm | −2.443 | −7.43 |
| Amount of tilt of second scanning lens | deg | 0.97 | 3.532 |

The effective scanning width means length in the main scanning direction of the scanning path of the light beam collected on the scanning surface, that is, the scanning line. "Entry-side angle (main)" means θm and "Entry-side angle (sub)" means θsi and θso. "θ⊥" of each light source means beam divergence angle in the main scanning cross section of the light beam emitted by each light source, and "θ//" of each light source means beam divergence angle in the sub-scanning cross section of the light beam emitted by each light source. "Aperture (main)" means length of a side of the aperture 1031, the side being parallel to the main scanning cross section, and "aperture (sub)" means length of a side of the aperture 1031, the side being parallel to the sub-scanning cross section. "First scanning lens" means the first scanning lens 1091, and "second scanning lens" means each of the second scanning lenses 1111. "Amounts of shift in sub-scanning direction of light source, collimator lens and aperture stop" mean distances between the center of each of the elements and the reference axis in the sub-scanning cross section. "Fiducial point of deflection" means the point of reflection on the polygon mirror 1071 of the principal ray of a light beam, the principal ray being perpendicular to the scanning surface in the main scanning cross section. "Distance between exit surface of collimator lens and fiducial point of deflection" means the distance between the center of curvature, that is, the apex of the exit surface of the collimator lens 1011 and the fiducial point of deflection in the main scanning cross section. The above-described distance is the distance in the reference axis direction between the center of curvature of the exit surface of the collimator lens 1011 and the fiducial point of deflection in the sub-scanning cross section. "Distance between aperture stop and fiducial point of deflection" means the distance between the center of the aperture stop 1031 and the fiducial point of deflection in the main scanning cross section. The above-described distance is the distance in the reference axis direction between the center of the aperture stop 1031 and the fiducial point of deflection in the sub-scanning cross section. "Distance between exit surface of cylindrical lens and fiducial point of deflection" means the distance between the center of curvature, that is, the apex of the exit surface of the cylindrical lens 1051 and the fiducial point of deflection in the main scanning cross section. The above-described distance is the distance in the reference axis direction between the center of curvature of the exit surface of the cylindrical lens 1051 and the fiducial point of deflection in the sub-scanning cross section. "Distance between fiducial point of deflection and entry surface of first scanning lens" means the distance between the fiducial point of deflection and the center of curvature, that is, the apex of the entry surface of the first scanning lens 1091 in the main scanning cross section. The above-described distance is the distance in the reference axis direction between the fiducial point of deflection and the center of curvature of the entry surface of the first scanning lens 1091 in the sub-scanning cross section. "Distance between fiducial point of deflection and entry surface of second scanning lens" means the distance between the fiducial point of deflection and the center of curvature, that is, the apex of the entry surface of each of the second scanning lenses 1111 in the main scanning cross section. The above-described distance is the distance in the reference axis direction between the fiducial point of deflection and the center of curvature of the entry surface of each of the second scanning lenses 1111 in the sub-scanning cross section. "Distance between exit surface of second scanning lens and photo conductor (scanning surface)" means the distance between the center of curvature, that is, the apex of the exit surface of each of the second scanning lenses 1111 and the photo conductor, that is, the scanning surface 300 in the main scanning cross section. The above-described distance is the distance in the reference axis direction between the center of curvature of the exit surface of each of the second scanning lenses 1111 and the scanning surface 300. The above-described distance is represented as BF. "Distance between fiducial point of deflection and scanning surface" means the distance between the fiducial point of deflection and the scanning surface 300 in the main scanning cross section or in the sub-scanning cross section. The above-described distance is represented as L. "Amount of shift in sub-scanning direction of second scanning lens" means the distance between the center of curvature of the entry surface of each of the second scanning lenses 1111 and the reference axis in the sub-scanning cross section. "Amount of tilt of second scanning lens" means the angle that x axis of each of the second scanning lenses 1111 and the sub-scanning direction forms.

The values of length of two sides of the aperture 1031 are determined such that the beam diameter in the main scanning direction on the scanning surface is 50 micrometers and that in the sub-scanning direction on the scanning surface is 55 micrometers.

Table 2 shows constants and coefficients representing the entry and exit surfaces of the first scanning lens 1091 and those of each of the second scanning lenses 1111 of Example 1.

TABLE 2

|  | First scanning lens | | Second scanning lens | |
| --- | --- | --- | --- | --- |
|  | Entry surface | Exit surface | Entry surface | Exit surface |
| R | −98.4909 | −51.8572 | −174.1714 | −913.1273 |
| K | −9.9840 | 0.8808 | −3.4979 | −7.2703 |
| X0Y1 | 0 | 0 | 0 | 0 |
| X2Y0 | −1.62611E−02 | −2.61054E−02 | 1.65000E−02 | −7.20946E−03 |
| X0Y2 | −1.22275E−03 | −3.66899E−04 | 2.45523E−03 | 6.59424E−04 |
| X2Y1 | −1.65217E−04 | −1.06606E−04 | 0 | 0 |
| X0Y3 | 0 | 0 | 0 | 0 |
| X4Y0 | −5.77458E−05 | −4.14415E−05 | −5.96065E−06 | 0 |
| X2Y2 | 5.76306E−06 | 8.31449E−07 | −6.25613E−08 | 3.51326E−07 |
| X1Y3 | 0 | 0 | 0 | 0 |
| X0Y4 | −6.35790E−07 | 1.30661E−06 | −2.10622E−08 | −3.37873E−08 |
| X4Y1 | −5.98145E−06 | −2.49136E−06 | 0 | 0 |
| X2Y3 | −6.97749E−08 | −4.21880E−08 | 0 | 0 |
| X0Y5 | 0 | 0 | 0 | 0 |
| X6Y0 | 0 | 0 | 0 | 0 |
| X4Y2 | 6.23133E−07 | 2.00932E−07 | 7.44742E−10 | 0 |
| X2Y4 | −2.27254E−08 | −8.40431E−09 | 9.62736E−12 | 0 |
| X0Y6 | −9.57313E−10 | −2.22878E−10 | −1.87706E−12 | −1.48918E−12 |
| X6Y1 | 0 | 0 | 0 | 0 |
| X4Y3 | 2.07988E−08 | 5.94404E−10 | 0 | 0 |
| X2Y5 | −8.87306E−10 | −4.56209E−10 | 0 | 0 |
| X0Y7 | 0 | 0 | 0 | 0 |
| X6Y2 | 0 | 0 | 0 | 0 |
| X4Y4 | −1.24126E−12 | 2.51416E−10 | 9.23713E−14 | 0 |
| X2Y6 | 9.51510E−12 | −4.40068E−12 | 3.34664E−16 | 0 |
| X0Y8 | 0 | 0 | 1.02377E−16 | −8.45275E−18 |
| X6Y3 | 0 | 0 | 0 | 0 |
| X4Y5 | 2.53444E−11 | 2.07634E−11 | 0 | 0 |
| X2Y7 | −1.39909E−13 | −2.89662E−13 | 0 | 0 |
| X0Y9 | 0 | 0 | 0 | 0 |
| X6Y4 | 0 | 0 | 0 | 0 |
| X4Y6 | 0 | 0 | −1.33387E−17 | 0 |
| X2Y8 | 0 | 0 | −8.08986E−20 | 0 |
| X0Y10 | 0 | 0 | 9.75557E−21 | 1.49042E−20 |

The equation representing each of the entry surface and the exit surface of the first scanning lens 1091 does not contain a term containing a term of an odd power of x. Accordingly, the shape in a yz cross section (corresponding to a main scanning cross section) of each of the entry surface and the exit surface of the first scanning lens 1091 is symmetric with respect to x=0. In other words, the shape in a yz cross section of each of the entry surface and the exit surface of the first scanning lens 1091 for a first value of x is identical with that for a second value of x, the absolute value of which is identical with that of the first value and the sign of which is opposite to that of the first value. The equation representing each of the entry surface and the exit surface of the first scanning lens 1091 contains a term containing a term of an odd power of y, such as X2Y1, X4Y1, X2Y3, X4Y3, X2Y5, X4Y5, and X2Y7. Accordingly, the shape in a xz cross section (corresponding to a sub-scanning cross section) of each of the entry surface and the exit surface of the first scanning lens 1091 is asymmetric with respect to y=0. In other words, the shape in a xz cross section of each of the entry surface and the exit surface of the first scanning lens 1091 for a first value of y is different from that for a second value of y, the absolute value of which is identical with that of the first value and the sign of which is opposite to that of the first value.

Thus, by making the shape in a xz cross section (corresponding to a sub-scanning cross section) of each of the entry surface and the exit surface of the first scanning lens 1091 asymmetric with respect to y=0, a curvature of field and a bow in the sub-scanning direction that are formed asymmetric in the main scanning direction can be appropriately corrected. A bow means a bend of the scanning line, and is represented as a difference between the maximum value and the minimum value of the coordinate in the sub-scanning direction. The reason that a curvature of field and a bow in the sub-scanning direction are formed asymmetric in the main scanning direction is that the point of reflection on the polygon mirror is shifted depending on the rotation angle of the mirror.

The equation representing each of the entry surface and the exit surface of each of the second scanning lenses 1111 does not contain a term containing a term of an odd power of x. Accordingly, the shape in a yz cross section (corresponding to a main scanning cross section) of each of the entry surface and the exit surface of each of the second scanning lenses 1111 is symmetric with respect to x=0. In other words, the shape in a yz cross section of each of the entry surface and the exit surface of each of the second scanning lenses 1111 for a first value of x is identical with that for a second value of x, the absolute value of which is identical with that of the first value and the sign of which is opposite to that of the first value. The equation representing each of the entry surface and the exit surface of each of the second scanning lenses 1111 does not contain a term containing a term of an odd power of y. Accordingly, the shape in a xz cross section (corresponding to a sub-scanning cross section) of each of the entry surface and the exit surface of each of the second scanning lenses 1111 is symmetric with respect to y=0. In other words, the shape in a xz cross section of each of the entry surface and the exit surface of each of the second scanning lenses 1111 for a first value of y is identical with that for a second value of y, the absolute value of which is identical with that of the first value and the sign of which is opposite to that of the first value.

Each of the entry surface and the exit surface of each of the second scanning lenses 1111 is shaped such that the curvature in a xz cross section varies depending on the absolute value of y. Thus, in a main scanning cross section, by making the curvature in a xz cross section of each of the entry surface and the exit surface at the center of the lens different from that at each edge of the lens, and in a sub-scanning cross section, by tilting x axis of the lens with respect to the sub-scanning direction as described above, the bow is corrected.

The second scanning lens 1111 has a negative refractive power in the vicinity of z axis and a positive refractive power at each edge, and is very thin with a relatively small ratio of the minimum thickness to the maximum thickness in a main scanning cross section. Molding cycle of a lens having such a shape is small, and productivity of the lens is high.

Example 2

Figure 5A:
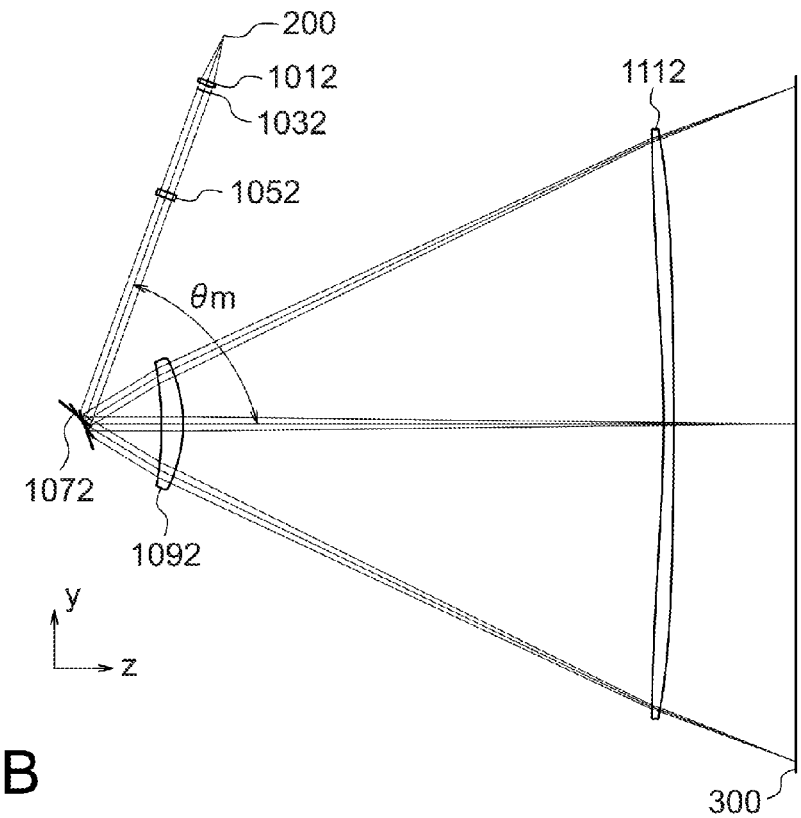
FIG. 5A shows a main scanning cross section of the optical scanning system of Example 2.
Figure 5B:
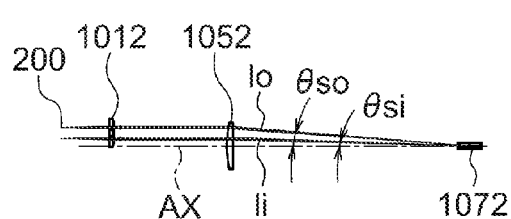
FIG. 5B shows a sub-scanning cross section of the optical system for receiving light of the optical scanning system of Example 2.
Figure 5C:
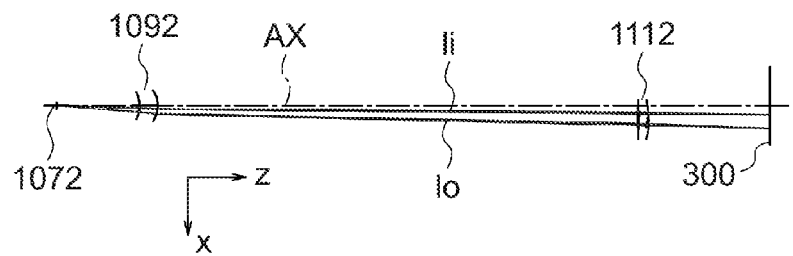
FIG. 5C shows a sub-scanning cross section of the optical system for imaging of the optical scanning system of Example 2.

FIGS. 5A, 5B and 5C show a construction of an optical scanning system of Example 2. FIG. 5A shows a main scanning cross section of the optical scanning system of Example 2. FIG. 5B shows a sub-scanning cross section of the optical system for receiving light of the optical scanning system of Example 2. FIG. 5C shows a sub-scanning cross section of the optical system for imaging of the optical scanning system of Example 2.

In the main scanning cross section shown in FIG. 5A, the angle that the path of the principal ray of the light beam that passes through the collimator lens 1012 and the center of the aperture stop 1032 and the path of the principal ray which is reflected by the polygon mirror 1072 and is perpendicular to the scanning surface 300 form is referred to as an entry-side angle θm in the main scanning cross section.

In FIG. 5A, y axis of the first scanning lens 1092 is in the main scanning direction (which is parallel to the scanning surface 300) and the positive direction is upward. Z axis of the first scanning lens 1092 is perpendicular to the scanning surface 300 and the positive direction is rightward.

In the sub-scanning cross sections shown in FIGS. 5B and 5C, two light beams alone among the four light beams actually existing are shown for the sake of simplicity of the drawings. Among the two light beams, the one that is positioned nearer to the reference axis is referred to as an inside light beam li and the other one is referred to as an outside light beam lo. In the sub-scanning cross section shown in FIG. 5B, the angle that the principal ray of the inside light beam li that is incident on the polygon mirror 1072 forms with the reference axis AX is referred to as an entry-side angle θsi of the inside light beam li in the sub-scanning cross section, and the angle that the principal ray of the outside light beam lo that is incident on the polygon mirror 1072 forms with the reference axis AX is referred to as an entry-side angle θso of the outside light beam lo in the sub-scanning cross section In FIG. 5C, x axis of the first scanning lens 1092 is in the sub-scanning direction (which is parallel to the scanning surface 300) and the positive direction is downward. Z axis of the first scanning lens 1092 is perpendicular to the scanning surface 300 and the positive direction is rightward.

Table 3A shows specifications the optical scanning system of Example 2 and Table 3B shows the arrangement of the optical scanning system of Example 2.

TABLE 3A

| Item | | Unit | Example 2 |
|---|---|---|---|
| Effective scanning width | | mm | 330 |
| Entry side angle | Main | deg | 70 |
| | Sub | deg | Inside light beam 1.8 |
| | | | Outside light beam 4.6 |
| Focal length of system | | mm | 300.397 |
| Light source | Wavelength | nm | 785 |
| | θ⊥ | deg | 30 |
| | θ// | deg | 10 |
| Collimator lens | Focal length | mm | 20 |
| Cylindrical lens | Focal length | mm | 120 |
| Aperture (rectangle) | Main | mm | 6.86 |
| | Sub | mm | 1.24 |
| Polygon mirror | Number of faces | — | 6 |
| | Size | mm | Diameter of circumcircle φ = 40 |
| First scanning lens | Center thickness | mm | 9 |
| | Refractive index | — | 1.503 |
| Second scanning lens | Center thickness | mm | 5 |
| | Refractive index | — | 1.485 |

TABLE 3B

| | | Arrangement | |
|---|---|---|---|
| Item | Unit | Inside light beam | Outside light beam |
| Amounts of shift in sub-scanning direction (of light source, collimator lens and aperture stop) | mm | 3.765 | 9.546 |
| Distance between exit surface of collimator lens and fiducial point of deflection | mm | 176 | 176 |
| Distance between aperture stop and fiducial point of deflection | mm | 173 | 173 |
| Distance between exit surface of cylindrical lens and fiducial point of deflection | mm | 117.5 | 117.5 |
| Distance between fiducial point of deflection and entry surface of first scanning lens | mm | 40 | 40 |
| Distance between fiducial point of deflection and entry surface of second scanning lens | mm | 285 | 285.413 |
| BF: Distance between exit surface of second scanning lens and photo conductor (scanning surface) | mm | 60 | 59.535 |
| L: Distance between fiducial point of deflection and scanning surface | mm | 350 | 349.948 |
| Amount of shift in sub-scanning direction of second scanning lens | mm | −4.013 | −10 |
| Amount of tilt of second scanning lens | deg | 1.189 | 3.195 |

Definitions of the terms in Tables 3A and 3B are identical with those in Tables 1A and 1B.

The values of length of two sides of the aperture 1032 are determined such that the beam diameter in the main scanning direction on the scanning surface is 50 micrometers and that in the sub-scanning direction on the scanning surface is 55 micrometers.

Table 4 shows constants and coefficients representing the entry and exit surfaces of the first scanning lens 1092 and those of each of the second scanning lenses 1112 of Example 2.

TABLE 4

| | First scanning lens | | Second scanning lens | |
|---|---|---|---|---|
| | Entry surface | Exit surface | Entry surface | Exit surface |
| R | −124.9898 | −58.4525 | −140.8001 | −351.6422 |
| k | −6.2486 | 0.1848 | −2.5805 | −10.0002 |
| X0Y1 | 0 | 0 | 0 | 0 |
| X2Y0 | −1.94595E−02 | −2.33109E−02 | 6.00000E−03 | −1.57900E−02 |
| X0Y2 | −2.34438E−04 | 1.08538E−03 | 2.75799E−03 | 1.22578E−03 |
| X2Y1 | −6.58209E−05 | −4.24753E−05 | 0 | 0 |
| X0Y3 | 0 | 0 | 0 | 0 |
| X4Y0 | −1.86045E−04 | −8.60886E−05 | 2.14699E−06 | 0 |
| X2Y2 | 2.61298E−06 | −2.25112E−07 | 1.56077E−07 | 5.00000E−07 |
| X1Y3 | 0 | 0 | 0 | 0 |
| X0Y4 | 1.69325E−07 | 7.81116E−07 | −1.63125E−08 | −1.90809E−08 |
| X4Y1 | −5.63456E−06 | −1.72148E−06 | 0 | 0 |
| X2Y3 | −1.74923E−07 | −8.28026E−08 | 0 | 0 |
| X0Y5 | 0 | 0 | 0 | 0 |
| X6Y0 | 0 | 0 | 0 | 0 |
| X4Y2 | 3.89176E−07 | 7.48296E−08 | −1.56863E−09 | 0 |
| X2Y4 | −4.45893E−09 | −1.19749E−09 | 2.20165E−11 | 0 |
| X0Y6 | −1.77903E−10 | 4.91218E−11 | −1.29229E−13 | −4.03831E−13 |
| X6Y1 | 0 | 0 | 0 | 0 |
| X4Y3 | 9.73343E−09 | 3.96830E−10 | 0 | 0 |
| X2Y5 | 5.59302E−11 | −1.92599E−11 | 0 | 0 |
| X0Y7 | 0 | 0 | 0 | 0 |
| X6Y2 | 0 | 0 | 0 | 0 |
| X4Y4 | −9.96281E−11 | 4.38102E−11 | 9.41600E−14 | 0 |
| X2Y6 | 1.46625E−12 | −3.46470E−13 | −1.27979E−15 | 0 |
| X0Y8 | 0 | 0 | 6.66872E−18 | 6.95494E−18 |
| X6Y3 | 0 | 0 | 0 | 0 |
| X4Y5 | −2.14938E−12 | 1.61648E−12 | 0 | 0 |
| X2Y7 | −3.08791E−14 | −1.43888E−14 | 0 | 0 |
| X0Y9 | 0 | 0 | 0 | 0 |

TABLE 4-continued

|  | First scanning lens | | Second scanning lens | |
| --- | --- | --- | --- | --- |
|  | Entry surface | Exit surface | Entry surface | Exit surface |
| X6Y4 | 0 | 0 | 0 | 0 |
| X4Y6 | 0 | 0 | −1.26392E−18 | 0 |
| X2Y8 | 0 | 0 | 2.56070E−20 | 0 |
| X0Y10 | 0 | 0 | 7.25196E−24 | 9.28452E−23 |

The equation representing each of the entry surface and the exit surface of the first scanning lens 1092 does not contain a term containing a term of an odd power of x. Accordingly, the shape in a yz cross section (corresponding to a main scanning cross section) of each of the entry surface and the exit surface of the first scanning lens 1092 is symmetric with respect to x=0. In other words, the shape in a yz cross section of each of the entry surface and the exit surface of the first scanning lens 1092 for a first value of x is identical with that for a second value of x, the absolute value of which is identical with that of the first value and the sign of which is opposite to that of the first value. The equation representing each of the entry surface and the exit surface of the first scanning lens 1092 contains a term containing a term of an odd power of y, such as X2Y1, X4Y1, X2Y3, X4Y3, X2Y5, X4Y5, and X2Y7. Accordingly, the shape in a xz cross section (corresponding to a sub-scanning cross section) of each of the entry surface and the exit surface of the first scanning lens 1092 is asymmetric with respect to y=0. In other words, the shape in a xz cross section of each of the entry surface and the exit surface of the first scanning lens 1092 for a first value of y is different from that for a second value of y, the absolute value of which is identical with that of the first value and the sign of which is opposite to that of the first value.

Thus, by making the shape in a xz cross section (corresponding to the sub-scanning cross section) of each of the entry surface and the exit surface of the first scanning lens 1092 asymmetric with respect to y=0, a curvature of field and a bow in the sub-scanning direction that are formed asymmetric in the main scanning direction can be appropriately corrected. A bow means a bend of the scanning line, and is represented as a difference between the maximum value and the minimum value of the coordinate in the sub-scanning direction. The reason that a curvature of field and a bow in the sub-scanning direction are formed asymmetric in the main scanning direction is that the point of reflection on the polygon mirror is shifted depending on the rotation angle of the mirror.

The equation representing each of the entry surface and the exit surface of the second scanning lens 1112 does not contain a term containing a term of an odd power of x. Accordingly, the shape in a yz cross section (corresponding to the main scanning cross section) of each of the entry surface and the exit surface of the second scanning lens 1112 is symmetric with respect to x=0. In other words, the shape in a yz cross section of each of the entry surface and the exit surface of the second scanning lens 1112 for a first value of x is identical with that for a second value of x, the absolute value of which is identical with that of the first value and the sign of which is opposite to that of the first value. The equation representing each of the entry surface and the exit surface of the second scanning lens 1112 does not contain a term containing a term of an odd power of y. Accordingly, the shape in a xz cross section (corresponding to a sub-scanning cross section) of each of the entry surface and the exit surface of the second scanning lens 1112 is symmetric with respect to y=0. In other words, the shape in a xz cross section of each of the entry surface and the exit surface of the second scanning lens 1112 for a first value of y is identical with that for a second value of y, the absolute value of which is identical with that of the first value and the sign of which is opposite to that of the first value.

Each of the entry surface and the exit surface of the second scanning lens 1112 is shaped such that the curvature in a xz cross section varies depending on the absolute value of y. Thus, in a main scanning cross section, by making the curvature in a xz cross section of each of the entry surface and the exit surface at the center of the lens different from that at each edge of the lens, and in a sub-scanning cross section, by tilting x axis of the lens with respect to the sub-scanning direction as described above, the bow is corrected.

The second scanning lens 1112 has a negative refractive power in the vicinity of z axis and a positive refractive power at each edge, and is very thin with a relatively small ratio of the minimum thickness to the maximum thickness in a main scanning cross section. Molding cycle of a lens having such a shape is small, and productivity of the lens is high.

Summary of Features of Examples and Comparison of Examples with Conventional Examples In general, refractive power ϕ of a lens is the reciprocal of the focal length f, and is obtained by the following expression.

$$\phi = 1/f = (n-1)*(1/rs1 - 1/rs2) + (n-1)^2 * t/(n*rs1*rs2)$$

In the expression, n represents refractive index, rs1 and rs2 respectively represent partial radius of curvature at the portion through which a ray passes at the entry surface and that at the exit surface, and t represents thickness of the lens. In the above-described expression, "*" represents multiplication.

When refractive power of the first scanning lens is represented by ϕ1s1 and refractive power of the second scanning lens is represented by ϕ2s1 for the inside light beam of Example 1, the following values are obtained.

$\phi 1s1 = 0.017866$ $\phi 2s1 = 0.020433$

Accordingly, the following equation holds.

$\phi 1s1/\phi 2s1 = 0.874$

When refractive power of the first scanning lens is represented by ϕ1s2 and refractive power of the second scanning lens is represented by ϕ2s2 for the outside light beam of Example 1, the following values are obtained.

$\phi 1s2 = 0.015601$ $\phi 2s2 = 0.020332$

Accordingly, the following equation holds.

$\phi 1s2/\phi 2s2 = 0.767$

When refractive power of the first scanning lens is represented by ϕ1s1 and refractive power of the second scanning lens is represented by ϕ2s1 for the inside light beam of Example 2, the following values are obtained.

$\phi 1s1 = 0.012635$ $\phi 2s1 = 0.018941$

Accordingly, the following equation holds.

$\phi 1s1/\phi 2s1 = 0.667$

When refractive power of the first scanning lens is represented by φ1s2 and refractive power of the second scanning lens is represented by φ2s2 for the outside light beam of Example 2, the following equations hold.

φ1s2=0.009966

φ2s2=0.018937

Accordingly, the following equation holds.

φ1s2/φ2s2=0.526

When distance in the reference axis direction between the center of curvature of the exit surface of one of the second scanning lenses and the scanning surface in the sub-scanning cross section for the inside light beam of Example 1 is represented by BF1, and distance between the fiducial point of deflection and the scanning surface in the main scanning cross section or in the sub-scanning cross section is represented by L1, the following equation is obtained by the use of data in Table 1B.

BF1/L1=0.188

When distance in the reference axis direction between the center of curvature of the exit surface of one of the second scanning lenses and the scanning surface in the sub-scanning cross section for the outside light beam of Example 1 is represented by BF2, and distance between the fiducial point of deflection and the scanning surface in the main scanning cross section or in the sub-scanning cross section is represented by L2, the following equation is obtained by the use of data in Table 1B.

BF2/L2=0.186

The lateral magnification in the sub-scanning direction (sub-magnification) of the optical system for imaging of Example 1 is 0.6. The value is not extremely small even though the second scanning lenses are positioned near to the scanning surface. Accordingly, the aperture size in the sub-scanning direction of the aperture stop set in the optical system for receiving light can be maintained relatively large, and therefore the optical system with high energy efficiency can be realized.

When distance in the reference axis direction between the center of curvature of the exit surface of one of the second scanning lenses and the scanning surface in the sub-scanning cross section for the inside light beam of Example 2 is represented by BF1, and distance between the fiducial point of deflection and the scanning surface in the main scanning cross section or in the sub-scanning cross section is represented by L1, the following equation is obtained by the use of data in Table 3B.

BF1/L1=0.171

When distance in the reference axis direction between the center of curvature of the exit surface of one of the second scanning lenses and the scanning surface in the sub-scanning cross section for the outside light beam of Example 2 is represented by BF2, and distance between the fiducial point of deflection and the scanning surface in the main scanning cross section or in the sub-scanning cross section is represented by L2, the following equation is obtained by the use of data in Table 3B.

BF2/L2=0.170

The lateral magnification in the sub-scanning direction (sub-magnification) of the optical system for scanning of Example 2 is 0.5. The value is not extremely small even though the second scanning lenses are positioned near to the scanning surface. Accordingly, the aperture size in the sub-scanning direction of the aperture stop set in the optical system for receiving light can be maintained relatively large, and therefore the optical system with high energy efficiency can be realized.

The output energy of the light source is defined as 100%, and the efficiency of the energy finally received by the photoconductive drum is calculated in consideration of transmittance and reflectance of each element. The above-described efficiency of the energy is the quotient of the energy finally received by the photoconductive drum divided by the output energy of the light source.

Table 5 shows a value of transmittance or a value of reflectance of each optical element.

TABLE 5

|  | Unit | Transmittance | Reflectance |
| --- | --- | --- | --- |
| Collimator lens | % | 92.2 | — |
| Cylindrical lens | % | 92.2 | — |
| Polygon mirror | % | — | 85 |
| First scanning lens | % | 92.2 | — |
| Second scanning lens | % | 92.2 | — |

When the efficiency of the energy finally received by the photoconductive drum is calculated, the efficiency of the light beam received by the collimator lens with respect to the light beam from the light source and the eclipse by the aperture stop are taken into consideration besides the value of transmittance or the value of reflectance of each optical element shown in Table 5.

Table 6 shows values of the ratio of distance BF in the reference axis direction between the center of curvature of the exit surface of each of the second scanning lenses and the scanning surface in the sub-scanning cross section and distance L between the fiducial point of deflection and the scanning surface in the main scanning cross section or in the sub-scanning cross section, the ratio of refractive power φ1s1 of the first scanning lens and refractive power φ2s1 of each of the second scanning lenses, sub-magnification, and the efficiency of the energy finally received by the photoconductive drum for Example 1, Example 2, Conventional Example 1 and Conventional Example 2.

TABLE 6

|  |  | Example 1 | | Example 2 | | Conventional Example 1 | | Conventional Example 2 | |
| --- | --- | --- | --- | --- | --- | --- | --- | --- | --- |
|  | Unit | Inside light beam | Outside light beam | Inside light beam | Outside light beam | Inside light beam | Outside light beam | Inside light beam | Outside light beam |
| Condition 1:BF/L | — | 0.188 | 0.186 | 0.171 | 0.170 | 0.292 | 0.292 | 0.242 | 0.242 |
| Condition 2: | — | 0.874 | 0.767 | 0.667 | 0.526 | 0.166 | 0.167 | 0.000 | 0.000 |

TABLE 6-continued

|  | Unit | Example 1 | | Example 2 | | Conventional Example 1 | | Conventional Example 2 | |
| --- | --- | --- | --- | --- | --- | --- | --- | --- | --- |
|  |  | Inside light beam | Outside light beam | Inside light beam | Outside light beam | Inside light beam | Outside light beam | Inside light beam | Outside light beam |
| φ1s2/φ2s2 Sub-magnification | — | 0.60 | 0.60 | 0.50 | 0.50 | 0.51 | 0.51 | 0.34 | 0.34 |
| Focal length of collimator | mm | 20 | | 20 | | 20 | | 20 | |
| Focal length of cylindrical lens | mm | 110 | | 120 | | 110 | | 110 | |
| Aperture width (Main scanning direction) | mm | 5.8 | | 6.86 | | 6.1 | | 4.1 | |
| Aperture width (Sub-scanning direction) | mm | 1.36 | | 1.24 | | 1.3 | | 0.61 | |
| Efficiency of energy received by photoconductive drum | % | 11.2 | | 12.2 | | 11.2 | | 3.8 | |

Conventional Example 1 and Conventional Example 2 are optical systems described respectively in JP2004-361941A and JP2004-070190A. The values of length of two sides of each of the apertures in Conventional Example 1 and Conventional Example 2 are determined such that the beam diameter in the main scanning direction on the scanning surface is 50 micrometers and that in the sub-scanning direction on the scanning surface is 55 micrometers as in the cases of Example 1 and Example 2.

When for a light beam i, refractive power of the first scanning lens is represented by φ1si, refractive power of the second scanning lens is represented by φ2si, distance between the center of curvature of the exit surface of the second scanning lens for the light beam i and the scanning surface is represented by BFi, and distance between the fiducial point of deflection and the scanning surface is represented by L, the optical systems of Examples 1 and 2 satisfy the following expressions (1) and (2).

$$0.15 \leq BFi/L \leq 0.2 \tag{1}$$

$$0.4 \leq \phi 1si/\phi 2si \leq 1 \tag{2}$$

On the other hand, the optical systems of Conventional Examples 1 and 2 do not satisfy any of the expressions (1) and (2).

Thus, in the optical systems of Examples 1 and 2, by determining φ1si/φ2si such that the expression (2) is satisfied, the lateral magnification m in the sub-scanning direction (sub-magnification) of the optical system for scanning is made relatively great although BFi is small. As a result, the aperture width (length of a side of the aperture) in the optical system for receiving light, which is parallel to a sub-scanning cross section is made relatively great, and therefore the energy efficiency is improved.

What is claimed is:

1. An optical scanning system comprising a system for receiving light and a system for imaging, the system for receiving light being configured such that plural light beams reach a single deflector and the system for imaging being configured such that each of the plural light beams deflected by the deflector is collected on a corresponding scanning surface, wherein the system for imaging comprising a first scanning lens and plural second scanning lenses, the first scanning lens being arranged to make the plural light beams pass through and each of the second scanning lenses being arranged to make each of the plural light beams pass through, wherein a direction which is parallel to the rotation axis of the deflector is designated as a sub-scanning direction, a cross section that has a normal extending in the sub-scanning direction is designated as a main scanning cross section, a direction which is obtained by projecting a direction in which each collected light beam moves on the corresponding scanning surface by scanning, onto the main scanning cross section is designated as a main scanning direction, and a cross section that has a normal extending in the main scanning direction is designated as a sub-scanning cross section, and wherein a point of reflection on the deflector of the principal ray of a light beam i among the plural light beams, i being an integer used to designate a light beam, in the case that the principal ray is incident normally to the corresponding scanning surface in a main scanning cross section is designated as a fiducial point, in a main scanning cross section, distance from the fiducial point to the corresponding scanning surface is designated as L, distance from the center of curvature of the exit surface of one of the second scanning lenses for the light beam i to the corresponding scanning surface is designated as BFi, refractive power of the first scanning lens for the light beam i is designated as φ1si, refractive power of the one of the second scanning lenses for the light beam i is designated as φ2si, and then the following expressions are satisfied.

$$0.15 \leq BFi/L \leq 0.2 \tag{1}$$

$$0.4 \leq \phi 1si/\phi 2si \leq 1 \tag{2}$$

2. An optical scanning system according to claim 1, wherein the system for receiving light is configured such that each of the plural light beams is reflected at a point on the deflector in a sub-scanning cross section.

3. An optical scanning system according to claim 1, wherein the system for receiving light includes plural collimator lenses, each of the plural collimator lenses collimating each of the plural light beams, and a cylindrical lens that collects the collimated plural light beams on a face of the deflector, and the focal length fcy of the cylindrical lens is 105 millimeters or more and 140 millimeters or less.

4. An optical scanning system according to claim 1, wherein each of the plural second scanning lenses has a negative refractive power in the vicinity of the straight line connecting the center of curvature of the entry surface and the center of curvature of the exit surface and has a positive refractive power at each edge in a main scanning cross section.

5. An optical scanning system according to claim 1, wherein when for each of the entry surface and the exit surface of the first scanning lens, the center of curvature is designated as the origin point, the straight line connecting the center of curvature of the entry surface and the center of curvature of the exit surface is designated as z axis, x axis and y axis orthogonal to each other are defined in a plane that contains a point of z=0 and is perpendicular to z axis, the first scanning lens is located such that y axis of the entry surface and y axis of the exit surface are in the main scanning direction, and x axis of the entry surface and x axis of the exit surface are in the sub-scanning direction, and the shape in a xz cross section of at least one of the entry surface and the exit surface of the first scanning lens is asymmetric with respect to y=0.

6. A combination of the first scanning lens and the plural second scanning lenses that are used in the optical scanning system according to claim 1.

\* \* \* \* \*